Feb. 3, 1953  W. J. SALTER  2,627,130
AUTOMATIC VEHICLE OPERATED GRAVITY CLOSURE
Filed Sept. 29, 1950
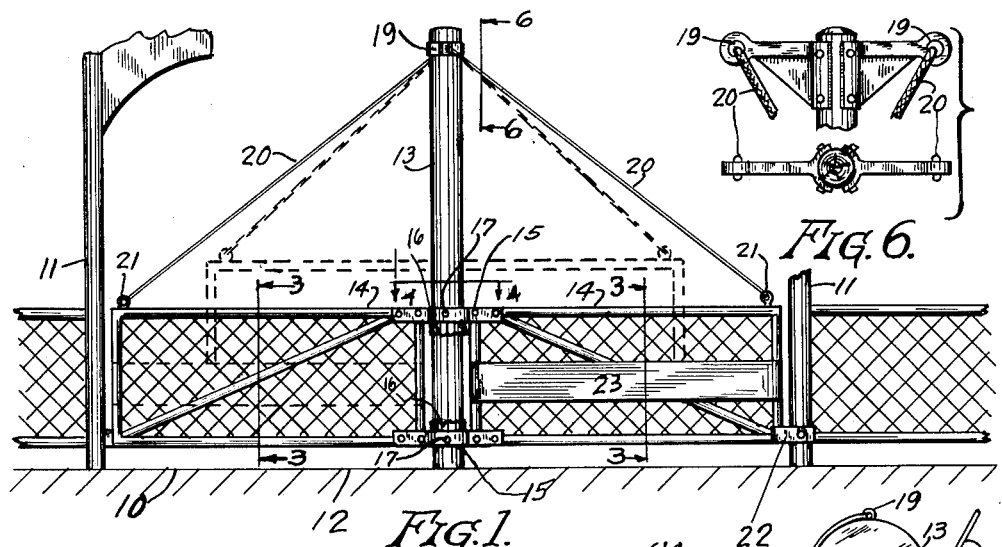
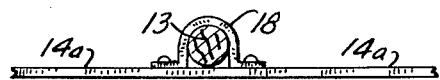
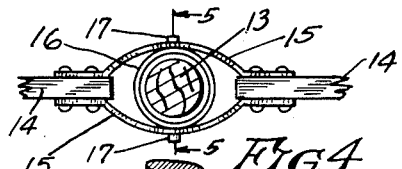
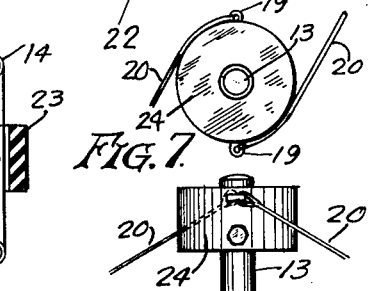
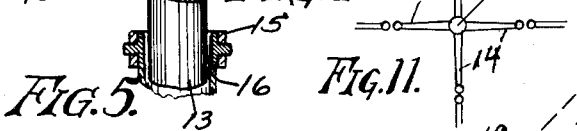
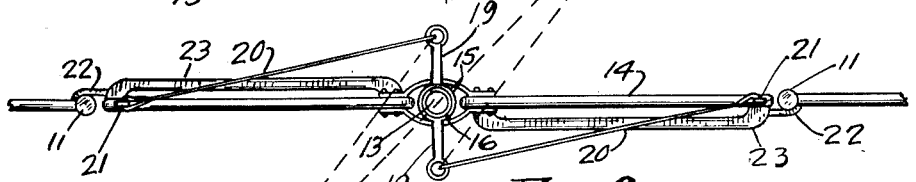
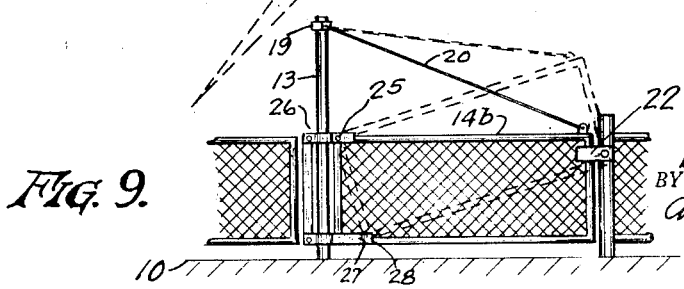
INVENTOR.
William J. Salter
BY Anderson & Muller
ATTORNEYS Patented Feb. 3, 1953

2,627,130

UNITED STATES PATENT OFFICE 2,627,130

AUTOMATIC VEHICLE OPERATED GRAVITY CLOSURE

William J. Salter, Wheatridge, Colo.

Application September 29, 1950, Serial No. 187,430

1 Claim. (Cl. 39—53)

This invention relates to improvements in automatic closures such as gates, doors and the like.

Where fences are employed as on farms, ranches or around city lots it is frequently necessary to pass from one side to the other, and where such roads or paths cross the line of a fence an opening is provided which is normally closed by a gate.

Where the fence is on a farm or ranch all gates are normally closed. Where a roadway crosses the fence line, as for example a road from the highway to a farmyard or farmstead, any gates must be opened and closed. If a person travels by automobile he must descend, open the gate, ascend the vehicle, drive through, stop, descend from the vehicle, close the gate, and again ascend the vehicle.

It is an object of this invention to produce a closure or gate that will open when urged to open position by an automobile, allow the automobile to pass and then automatically close whereby a person driving an automobile may pass without leaving the seat, and which will automatically return to closed position.

A further object is to produce an automatic closure which does not employ springs, cams or threads and which therefore will not be deleteriously affected by snow or rain.

Another object is to produce a closure of such construction and design that the force of gravity acting on the mass of the gate will be converted in part to torque of sufficient value to move the closure to closed position.

A still further object is to produce a gate of such design that it can be made from rough material so that it may have a rustic effect.

A still further object is to produce a gate in which the torque producing means also serves to support the gate from positions adjacent its ends to prevent sagging, common with gates supported in the manner of cantilevers.

The above and other objects that may become apparent as the description proceeds are attained by means of a construction and an arrangement of parts that will now be described in detail, for which purpose reference will be had to the accompanying drawing in which the invention has been illustrated, and in which:

Figure 1 is a side elevation showing the invention embodied in a fence gate;

Figure 2 is a top plan view of the gate;

Figure 3 is a section taken on line 3—3 Figure 1;

Figure 4 is a section taken on line 4—4, Figure 1, showing one form of hinge or bearing;

Figure 5 is a side elevation of the hinge shown in Figure 4;

Figure 6 is a side elevation taken looking through plane 6—6, Figure 1, and a top plan view;

Figure 7 is a top plan view of the pivot post showing a slight modification;

Figure 8 is a side elevation of the parts shown in Figure 7;

Figure 9 is a side elevation showing the invention applied to a single gate;

Figure 10 is a diagrammatic view showing a gate made in one section; and

Figure 11 shows diagrammatically a quadruple gate.

Referring now to the drawing, reference numeral 10 designates the supporting surface, for example, the surface of the ground. The invention will be described as a fence gate, although it is to be understood that it is not so limited. Reference numerals 11 designate the end posts of a fence between which passes a roadway or walk 12. In Figure 1 a high, strong post 13 is positioned midway between posts 11 and forms the pivot about which gate 14 swings. The gate illustrated in Figures 1 and 2 is made of two sections which may be identical as to size and construction which are connected by bars 15 which embrace ring or pipe 16 and are connected with the latter by trunnions 17. Ring 16 encircles post 13. There are two hinges as shown in Figure 1.

In Figure 10 the gate has been shown as formed from a single section 14a that is pivotally connected at its center by U-straps 18. The two constructions have been shown as examples of pivots or hinges and may be replaced by suitable mechanical equivalents. Extending radially from near the top of post 13 are eye brackets 19 or other equivalent means, to the ends of which cables 20 are anchored. The other ends of the cables are anchored to the ends of the gate at points 21 near the ends thereof. The cables are of such length that the gate is supported entirely by the cables. It will be observed that stops 22 are provided either on the fence or on the gate which limit its rotation in one direction. In the drawing, stops 22 have been shown as attached to the fence, but they may obviously be attached to the gate, in which case they will be on the other side of the gate. In the drawing, brackets 19 have been shown as projecting at right angles to the line of the fence. When the cables are connected as shown in Figure 2 there will be a component of force tending to hold the gate closed and in engagement with the stops. Let us now assume that the gate is supported as shown in Figures 1 and 2 and that force is applied to either one of the bumper plates 23 in the direction of the arrows. The gate will swing open toward the position shown by broken lines. Since cables 20 form the hypothenuses of right angle triangles in which the gate forms one side and the distance from the gate to brackets 19 the other, it is evident that the shorter or vertical side must shorten as the gate moves toward open position, and this results in a torque that tends to return the gate to closed position. The amount of torque depends in part on the weight of the gate and the relationship of the side of the triangle and also on the lengths of brackets 19 and their angular relation with respect to the plane of the closed gate.

In Figures 7 and 8 the upper end of post 13 has been shown as provided with a cylinder 24 about the surface of which the cables 19 wrap as the gate opens. This maintains the distance from the post to the cables constant at all positions of the gate and constitutes a refinement.

In Figures 1 and 2 a double gate pivoted at its center has been shown. It is practical to adapt the closing means to single gates like that designated by 14b in Figure 9, in which case the gate is pivoted at its upper inner corner 25 to a hinge 26 and has its lower inner corner 27 slideable between guides 28. When the gate is moved toward open position the outer end will be elevated as indicated by the broken lines.

Figure 11 shows how two gates like those shown in Figures 1 and 2 may be arranged at right angles and used for simultaneously opening and closing four openings. With such gates having an equal number of angularly related sections, one set of cables is usually sufficient.

It is, of course, evident that the specific construction of the brackets by means of which the cables are attached to the top of the pivot post, can be varied in any desired manner so long as it performs the intended function.

Where brackets like those shown in Figure 6 are used and positioned in planes perpendicular to the plane of the gate when it is in closed position the torque tending to move the gate toward closed position will be a maximum and will diminish as the gate opens, being a minimum when the gate is fully open. When the top of the post is provided with a cylinder as in Figures 7 and 8 the closing torque remains substantially constant at all positions of the gate.

Gates or closures constructed in the manner shown and described can be advantageously employed at railway crossings. Such gates will always remain closed when not purposely opened for passage. Such gates will make it necessary for a vehicle or driver to stop or at least slow down materially, and thus reduce the danger of crossing the track when a train is approaching. The construction shown and described is also well adapted for garage and stable doors.

The gates that are used for closing a roadway are provided with bumpers 23 and a person approaching in an automobile drives slowly against the gate bumper, whereby the gate opens and is retained open by the automobile until the latter has passed through, and then returns to closed position.

Cattle will not open the gate unless specially trained to do so.

The gate may be made of any size and of any material.

Since no cams or threaded surfaces are used, exposure to the weather will not affect the operation. The cables 20 produce the necessary torque to close the gate, and since pipe 16 can fit the post closely, the operation is not interfered with by rust or corrosion, since this bearing can be lubricated if desired.

Having described the invention, what I claim as new is:

A gate for closing an opening in a fence or the like, comprising a stationary vertical post positioned at the center of the opening, a gate having a length substantially equal to the length of the opening, connected at its middle point with the post for limited angular movement about the axis of the post, a cable connected with each upper end corner of the gate, said cables having their upper ends connected with the post at points spaced from the center thereof, said points being on opposite sides of a diameter of the post and on opposite sides of the plane of the gate when the latter is in closed position, the cables being of such length that the gate is supported entirely by them, whereby when the gate is turned about the post it will be moved vertically and whereby it will tend to return to its lowermost position.

WILLIAM J. SALTER.

REFERENCES CITED

The following references are of record in the file of this patent:

UNITED STATES PATENTS

| Number | Name | Date |
|---|---|---|
| 65,327 | Alexander | June 4, 1867 |
| 948,788 | Matthews | Feb. 8, 1910 |
| 1,190,026 | Slyfield | July 4, 1916 |
| 1,359,764 | Somers | Nov. 23, 1920 |